(12) United States Patent
Tondolo

(10) Patent No.: US 11,092,499 B2
(45) Date of Patent: Aug. 17, 2021

(54) INTEGRATED SYSTEM AND METHOD FOR MEASURING DEFORMATIONS AND/OR STRESSES IN ONE-DIMENSIONAL ELEMENTS

(71) Applicant: POLITECNICO DI TORINO, Turin (IT)

(72) Inventor: Francesco Tondolo, Turin (IT)

(73) Assignee: POLITECNICO DI TORINO

( * ) Notice: Subject to any disclaimer, the term of this patent is extended or adjusted under 35 U.S.C. 154(b) by 0 days.

(21) Appl. No.: 16/462,783

(22) PCT Filed: Nov. 21, 2017

(86) PCT No.: PCT/IB2017/057279
§ 371 (c)(1),
(2) Date: May 21, 2019

(87) PCT Pub. No.: WO2018/096443
PCT Pub. Date: May 31, 2018

(65) Prior Publication Data
US 2019/0316979 A1    Oct. 17, 2019

(30) Foreign Application Priority Data
Nov. 22, 2016 (IT) .................. 102016000118077

(51) Int. Cl.
*G01L 9/00* (2006.01)
*G01L 1/02* (2006.01)

(52) U.S. Cl.
CPC .............. *G01L 1/02* (2013.01); *G01L 9/0045* (2013.01)

(58) Field of Classification Search
None
See application file for complete search history.

(56) References Cited

U.S. PATENT DOCUMENTS

| | | | |
|---|---|---|---|
| 4,563,906 A | 1/1986 | Mathias | |
| 6,898,339 B2 * | 5/2005 | Shah | ................. G01M 11/0221 250/227.14 |
| 2011/0257907 A1 * | 10/2011 | Kalpin | .............. A61M 5/14276 702/50 |

(Continued)

FOREIGN PATENT DOCUMENTS

| | | |
|---|---|---|
| DE | 20 2014 005194 | 7/2014 |
| DE | 10 2013 012690 | 2/2015 |

OTHER PUBLICATIONS

International Search Report and Written Opinion of the International Searching Authority, PCT/IB2017/057279, European Patent Office, dated Jul. 5, 2018.

*Primary Examiner* — Lisa M Caputo
*Assistant Examiner* — Nigel H Plumb
(74) *Attorney, Agent, or Firm* — Valauskas Corder LLC

(57) ABSTRACT

An integrated measuring system comprises a structural element for building constructions, having an internal cavity, hermetically closed to contain a compressible fluid, and a measuring system for measuring stresses and/or deformations on the structural element, whereby it is possible to measure pressure and temperature of the compressible fluid so as to measure a change in the compressible fluid pressure and determine a variation of the volume of the internal cavity resulting from an action imparted to the structural element.

13 Claims, 4 Drawing Sheets

(56) References Cited

U.S. PATENT DOCUMENTS

2012/0265174 A1* 10/2012 Gray ................ A61M 5/14276
                                                                604/891.1
2013/0145853 A1* 6/2013 Donzier ................ G01L 9/0042
                                                                 73/706

* cited by examiner

INTEGRATED SYSTEM AND METHOD FOR MEASURING DEFORMATIONS AND/OR STRESSES IN ONE-DIMENSIONAL ELEMENTS

CROSS-REFERENCE TO RELATED APPLICATIONS

This application is a U.S. National Phase filing of PCT International Patent Application No. PCT/162017/057279, having an international filing date of Nov. 21, 2017, which claims priority to Italian Patent Application No. 102016000118077, filed Nov. 22, 2016 each of which is hereby incorporated by reference in its entirety.

TECHNICAL FIELD

The present invention is generally in the field of measurements of forces, stresses, deformations, etc.; in particular, the invention refers to an integrated system and a method for measuring the deformation and/or stress in structural elements adapted to be incorporated in building constructions.

BACKGROUND OF THE INVENTION

The measurement of deformations in structural elements is generally carried out using electrical strain gauges, electrical and mechanical comparators, vibrating wire strain gauges or fiber optics with Bragg gratings. The aim is to measure the average deformation with respect to a measurement base on the order of a few millimeters (electrical strain gauges) or up to several tens of centimeters (vibrating wire strain gauges).

Such instruments may be applied to the external surface of the elements to be measured for deformation, or they may be inserted inside the structures, as in the case of civil structures made of reinforced concrete. In the latter case, the devices are positioned before the casting of the concrete, thus becoming embedded within the elements themselves.

Instruments such as electrical strain gauges may be applied both on the outside and the inside of the structures. Traditionally, when placed internally, they are bonded to the metal reinforcement bars. On the other hand, if applied to the surface, they are bonded directly to the concrete.

Optical fibers are also traditionally used as a system for measuring deformation, and may be positioned both internally and externally in reinforced concrete structures. Some known solutions include the use of fiber optics with Bragg gratings housed and bonded inside a seat formed along the longitudinal ribs of steel bars.

Generally, optical fibers are fastened to the reinforcement grating and embedded in the casting, or are bonded externally to the element the deformations of, which are to be measured.

Electrical and mechanical comparators are generally applied outside the structures. The measurements made by such devices are related to respective bases of measurement, i.e. to pairs of spaced application points. The distance between the bases of measurement is usually on the order of centimeters, and the elongation value read is divided by the distance between the bases to provide the average deformation.

Vibrating wire strain gauges may be used both as external and internal systems and exploit the variation of the vibration frequency of a component of the system to trace the elongation between two fixed points (bases) and thus an average deformation in reference to such bases.

It may be stated that the measurement of deformation is more accurate and, in some respects, more useful for structural monitoring, the shorter the length of the measurement base with respect to the structural dimensions.

It is also important to note that devices, such as electrical strain gauges, if applied on the surfaces of interfaces between different materials (e.g. on the outer surface of reinforcing bars in reinforced concrete elements), may give rise to insignificant measurements also due to local cracks and sliding, as well as to alteration of the adhesion between the steel and concrete locally.

In order to overcome this drawback, a prior art solution has been proposed which involves cutting a steel bar for reinforced concrete longitudinally in two parts and bonding the strain gauges in a recess centered on the axis of the bar, then rejoining the two cut parts of the steel bar by welding. In this way, the aforementioned problem of the application of the strain gauges on the steel-concrete interface is overcome, and such solution allows the deformation value along the axis of the steel element to be obtained. Moreover, the inner axial position of each strain gauge with respect to the bar allows the use of a single strain gauge instead of a pair of strain gauges applied on opposite faces.

The monitoring of the steel reinforcement elements allows deformations/stresses, both in compression and in tension, to be detected, as opposed to what is possible in the case of monitoring on concrete, which may crack if it is stressed in tension beyond its strength limit. In the latter case, information about deformation/stress would be lost. This represents a major benefit for monitoring systems applied to steel elements.

It may also be noted that, from a practical point of view, the installation of integrated devices within a generic concrete casting for the measurement of concrete deformations is made more complicated by the need to provide a framework that supports the same devices, so that they may be stably positioned during the casting stages.

In this respect, the metallic reinforcements, already included for reinforced concrete elements and structures, are a natural location for monitoring devices.

Moreover, since concrete is a material obtained from the union of various components (aggregates, formations due to cement hydration or other binders, additives and additions, etc.), any measurement will be affected by intrinsic variability due to such heterogeneity. Moreover, delayed deformations of the concrete, evaluated locally, may result in measurements with wide dispersion. Steel elements are much more homogeneous; they do not directly suffer from rheological effects, and therefore the accuracy, linearity and repeatability of the measurements are decidedly greater.

However, the reliability of the aforementioned traditional devices is limited due to electrical drifts or the durability of the systems themselves, especially if applied to the outside of the structures and therefore subject to aggressive environments.

Moreover, built-in devices that measure deformations in concrete may be easily damaged by installation and casting operations.

In addition, stress/force measuring systems according to the prior art have dimensions that are often unsuitable for the local detection of deformations/stresses, as well as have, in most cases, a significant unit cost.

Alternatively, in the prior art, a measurement system of the stress loaded on a structural element is considered, wherein such measurement is performed by reading the variation of physical parameters within a longitudinal cavity formed in the body of the structural element and filled with an incompressible fluid. An example of such a measurement system is known from the document DE 10 2013 012690 A1.

Specifically, this system allows the force acting on the pin of a pulley, on which a cable for lifting a load is wound, to be evaluated through the pressure variation in the cavity induced by the bending of the pin. To this end, the cavity is made with a parallel axis that is not coincident with respect to the longitudinal axis of the pin for a length substantially comparable to the length of the pin itself. In fact, if the axis of the cavity coincides with that of the pin, a correct measurement of the force applied thereon cannot be obtained, a measurement that becomes all the more significant, the greater the length of the cavity.

However, a system which is configured in such a way is not applicable to structural elements for building constructions, which have a substantially single-dimensional shape (in the sense that the longitudinal dimension is decisively dominant over the transverse dimension, even by tens of times), where the pin of the example of the prior art is a deep object, which is not meant to be embedded in the structural element of a construction. In fact, it would be necessary to have a cavity that is too long and would be difficult to achieve in practice. Moreover, the eccentric position of such cavity, with respect to the longitudinal axis of the structural element, would impair the measurement of the deformations, as it would suffer unwanted flexural contributions.

SUMMARY OF THE INVENTION

One object of the present invention is to remedy the aforementioned problems.

According to the present invention, a system for measuring a deformation of a structural element suitable to be incorporated into a building construction comprises a cavity oriented perpendicular to a central longitudinal axis of the structural element.

Such cavity is filled with a compressible fluid and sealed, so that when the structural element is affected by an action F along its longitudinal axis (an action that may be mechanical or thermal, such as a longitudinal tensile action, or an expansion due to an increase in temperature), the cavity undergoes a deformation, which causes a variation in the pressure and temperature of the fluid inside. By detecting such variations in pressure and temperature, it is possible to trace (as will be appreciated in the following description) the value of the deformation sustained by the cavity and therefore by the structural element. Since the cavity is oriented perpendicularly with respect to the axis of the structural element, the estimation of the deformation value is not affected by undesirable flexural contributions. Moreover, it is possible to apply a plurality of measuring systems arbitrarily distributed along the longitudinal direction of the structural element. In this way, an estimate of local deformation may be obtained in a plurality of points along the whole or part of the length of the structural element, where such an objective cannot be achieved with a solution according to the prior art, since it always provides a measurement mediated on the length of the cavity, this length being a fraction of the length of the structural element. With a system and a method according to the present invention, a plurality of measurement systems may also be carried out in a practical and convenient manner, since it is sufficient to make simple transverse holes in the structural element, while the solution adopted in the prior art would be much more complex to achieve, as it requires making a longitudinal cavity along a substantially single-dimensional element, a cavity moreover eccentric with respect to the longitudinal axis thereof.

In summary, a generic action (in the example shown, a tensile stress) applied to the structural element (in the example shown, a substantially one-dimensional element, with a constant cross-section along its own axis), modifies in a known manner, according to the mechanics of the continuum, the whole structure of the element, and in particular the volume of the cavity obtained therein.

Deformations due to other actions acting along the remaining directions are generally added to the deformation in the axial direction, so as to formulate a three-dimensional deformation.

In elements stressed mainly along their axis, actions in the transverse direction may be considered negligible; it follows that the volume variation of the cavity is mainly caused by the axial action and the related Poisson effect.

The volume variation of the cavity (appropriately sealed hermetically by one or more closure components) is related to the pressure variation and the temperature of the fluid contained therein. In particular, the initial fluid pressure and temperature and the variations thereof are measured by means of respective devices. Pressure and temperature measurements allow the volume variation of the cavity to be estimated and correlated with the deforming state of the element by providing a measurement thereof.

Since the cavity is substantially configured to prevent changes in the amount of fluid, it is possible to refer first to the law of perfect gases as follows:

$$PV=nRT$$

where P is the fluid pressure, V is the volume of the cavity, n is the amount of fluid inside the cavity, R is a constant and T is the absolute temperature (or thermodynamic temperature).

In a structural element with a constant section stressed by a constant force F along the axis (as shown in FIG. 1), in the sections wherein the cavity is present, deformations in the longitudinal direction are on average higher in absolute value than those recorded in sections placed before and after the cavity along the longitudinal axis of the structural element. Likewise, for an action due to an impressed deformation on the ends of the structural element, the tensions in the longitudinal direction are on average higher in absolute value than those recorded in sections positioned before and after the cavity along the longitudinal axis of the element. This phenomenon is due to the reduction of the resistant area in the sections wherein the cavity, and in general the whole measuring system, are present.

Moreover, the distribution of deformations (action of a force) and stresses (action of an impressed deformation) is generally not homogeneous in the zones where the cavity is present, due to the perturbation in the field of deformations and stresses caused by the presence of the cavity itself. It is important to emphasize how these stress concentrations are normally present in the ribbed steel elements near the outer ribs.

If the impressed deformation due to temperature variation is constrained, the system may estimate the internal stresses by reading the pressure variation in the presence of constant volume (effect of a temperature variation) and by knowing the physical characteristics of the material of the structural element.

Given the geometry of the system, zones with deformation/stress spikes form around the cavity, which affect very limited areas and wherein plastic deformations may occur; a negligible influence on the volume variation results, in comparison with the value of the average deformation calculated on the section of the structural element, appropriately removed from the section of the cavity. Deformations beyond the elastic limit of the material lead to non-linearity of the system's response.

The graph in FIG. 3 shows the results of a first experiment on steel elements for reinforced concrete. One may see that the results in FIG. 3 show a good linearity and a lack of hysteresis.

In particular, the graph shows the pressure variation in the cavity at the variation in the stress applied to the structural element in constant temperature conditions. Curves A, B represent the trends of a first and a second experimental measurement cycle, respectively.

In the system, pressure measuring devices, of a type known per se, may be implemented.

An integrated system according to the present invention, inside structural elements (for example, steel bars, in the case of reinforced concrete structures), is an economical and reliable solution for measuring deformations/stresses, and more generally for structural monitoring purposes.

The aforementioned objects and other advantages are achieved, according to the present invention, by an integrated system and a method for measuring the deformation and/or stress in structural elements having the features described and claimed herein.

BRIEF DESCRIPTION OF THE DRAWINGS

The functional and structural features of some preferred embodiments of an integrated system and a method for measuring the deformation and/or stress in structural elements according to the invention will now be described. Reference is made to the accompanying drawings, wherein.

DETAILED DESCRIPTION

Figure 1C:
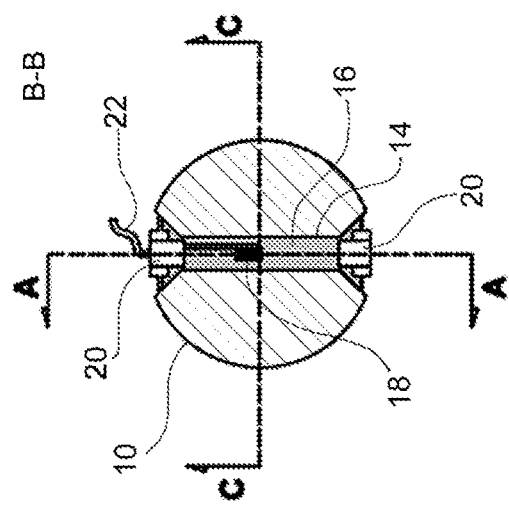
FIGS. 1A to 1C are schematic sectional views of a structural element comprising an integrated measurement system according to an embodiment of the invention, respectively according to two planes perpendicular to each other, passing through the longitudinal axis of the structural element; and a transverse plane perpendicular to the first two.

Before explaining in detail a plurality of embodiments of the invention, it should be clarified that the invention is not limited in its application to the details of construction and to the configuration of the components presented in the following description or illustrated in the drawings. The invention may assume other embodiments and may be implemented or achieved in essentially different ways. It should also be understood that the phraseology and terminology are for descriptive purposes and should not be construed as limiting.

Figure 1A:
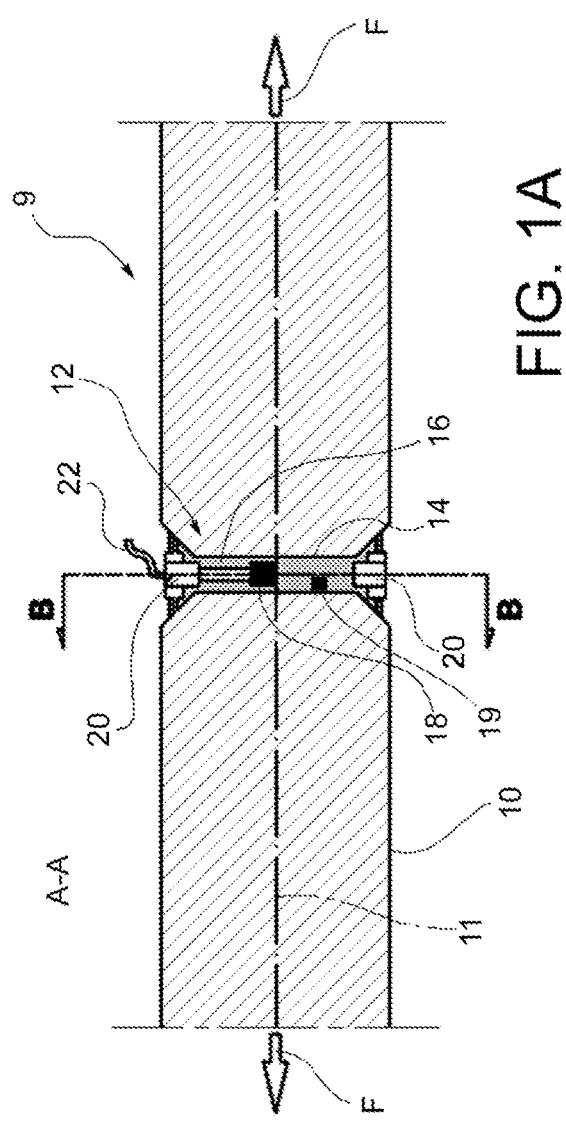
Figure 1B:
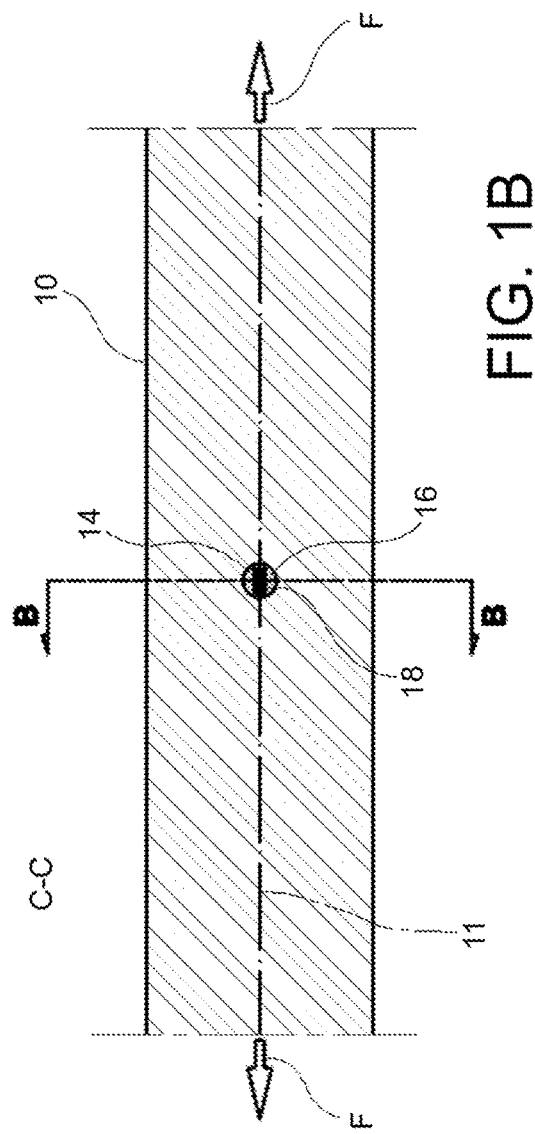
Figures 2A, 2B:
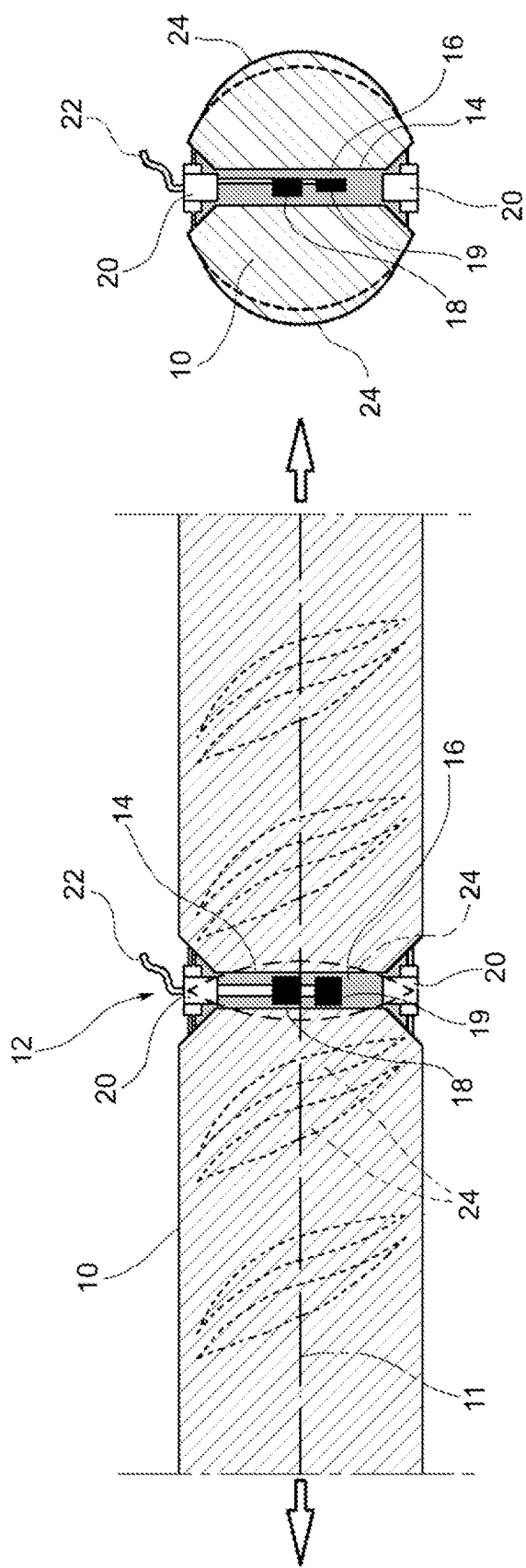
FIGS. 2A and 2B are schematic sectional views of a structural element comprising an integrated measurement system according to an embodiment of the invention, respectively according to a plane passing through the longitudinal axis of the structural element, and a transverse plane perpendicular to the former.
Figure 3:
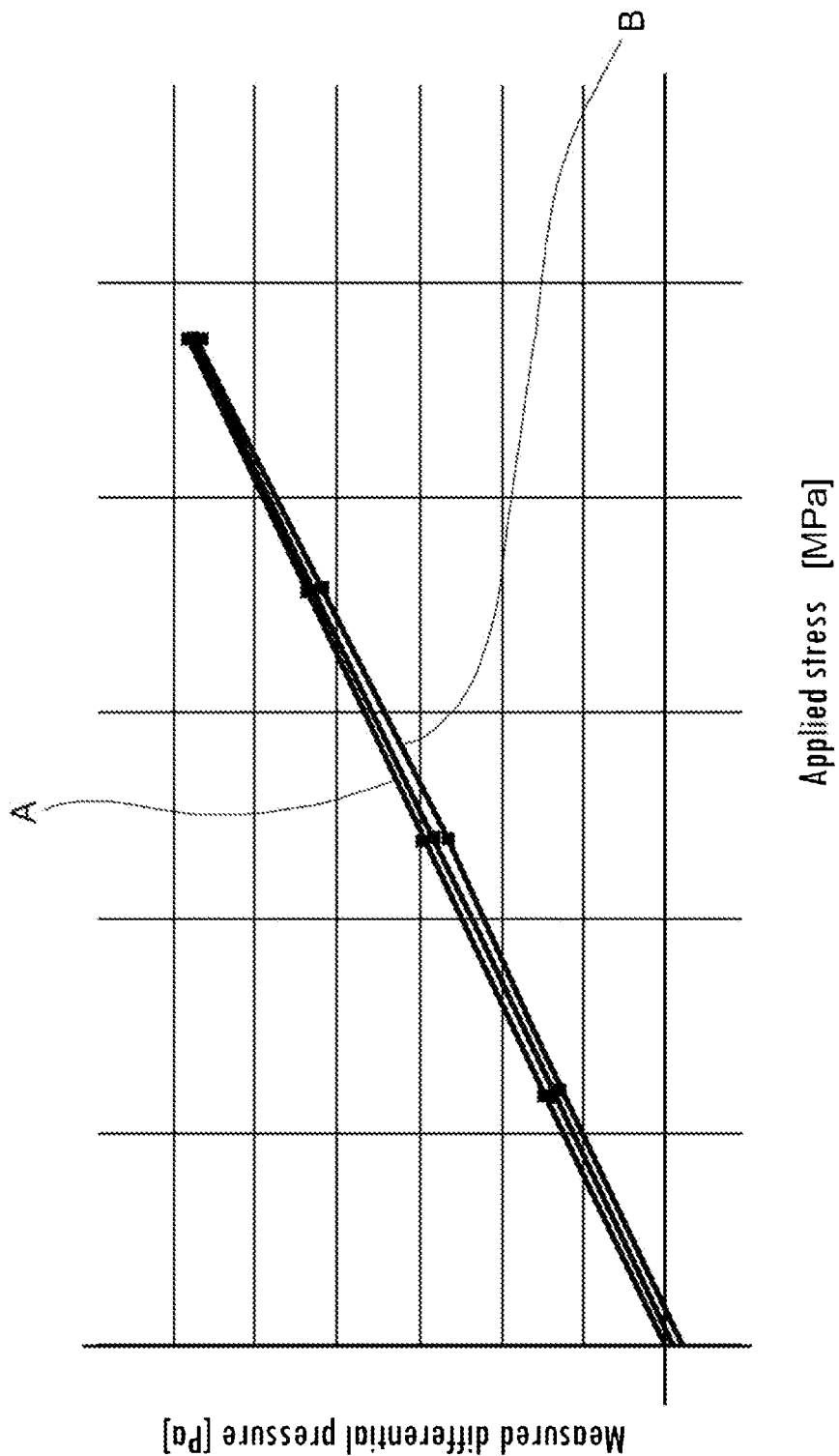
FIG. 3 is a diagram illustrating schematically the pressure variation in the cavity of the system as the stress applied on the structural element varies in constant temperature conditions.

Referring by way of example to FIG. 1, an integrated measuring system 9 comprises a structural element 10, adapted to be incorporated into a building construction and elongated in a longitudinal direction. This structural element 10 is subject to an action F (in the example shown, a tensile stress applied to the ends of element 10).

The structural element 10 has a longitudinal axis 11; in the example shown, such element 10 has a circular cross-section and is substantially axially symmetrical with respect to the axis 11.

In the example shown, the structural element 10 is a metallic bar or rod, intended to be embedded in a reinforced concrete element.

A measuring system 12, suitable to measure deformations and/or stresses on the structural element 10 along said longitudinal direction, is at least partially housed in a cavity 14 inside such element 10.

The cavity 14 is transversely extended with respect to the structural element 10 and perpendicularly to the longitudinal axis 11. Preferably, the cavity 14 passes through the structural element 10, and/or intercepts the longitudinal axis 11.

Such cavity 14 is filled with a compressible fluid (as will be better appreciated in the following description). Conveniently, the cavity 14 is sealed or sealable hermetically.

The cavity 14, in the case, for example, of steel bars for reinforced concrete, may be obtained by perforation, punching, excavating, laser cutting, shaping and any other type of machining of the material of the element to be evaluated for deformation variations.

The cavity 14 is appropriately formed so as to maintain as much symmetry as possible with respect to the longitudinal axis 11 of the structural element 10, or at least with respect to a plane passing through the axis of such element.

In the entire present description and in the claims, the terms and expressions indicating positions and orientations, such as "longitudinal" or "transversal", refer to the longitudinal axis 11.

The measuring system 12 comprises a sensor or pressure measuring device 18 for measuring the pressure of the compressible fluid 16 contained within the cavity 14. Conveniently, the pressure measuring device 18 is immersed in the fluid 16.

Preferably, the fluid 16 introduced in the cavity 14 is selected from those that prevent the formation of corrosion inside the cavity and possess large molecules so as to avoid leakage of material. Conveniently, the compressible fluid 16 may be a gas or a mixture of gas and liquid.

Furthermore, the measuring system 12 comprises a temperature measuring device (19) that may be placed inside or outside the cavity 14 so as to measure the temperature of the fluid 16 contained in the cavity 14 and/or the inner wall of the cavity 14. It may be desirable to measure the temperature of the inner wall of the cavity 14, in addition to or as an alternative to measuring the temperature of the fluid 16 as, for example, the operation of any electronic devices of the system (which may include the aforementioned measuring devices as well as other devices, for example of the type illustrated in the following description) could change the temperature of the fluid 16 inside the cavity 14, and therefore change the pressure without the structural element actually being deformed.

As mentioned in the introductory part of this description, once the pressure and temperature data of the fluid 16 is acquired within the cavity 14, it is possible to estimate the volume variation of the cavity 14 and consequently to trace the value of deformation sustained by the structural element 10 due to the action F. For example, depending on the fluid employed, it will be possible at first approximation to apply the law of perfect gases to obtain an estimate of the extent of deformation in the longitudinal direction of the structural element 10.

Optionally, a thermal calibration phase of the system may be provided to isolate the contribution to longitudinal deformation due to adding or reducing heat in the structural element 10.

Such procedure, already applied in the prior art, comprises the step of establishing a priori a correlation between the temperature and the deformation of the structural element 10, subject to the design operating conditions. This result may be obtained, for example, by performing a series of tests on a specimen subject to the same conditions in which the structural element would operate, recording the effect of one or more temperature variations on the deformation of such structural element, so as to extrapolate a rule that relates deformation and temperature.

Once the correlation between temperature and deformation is established, the system may be calibrated to take into account the contribution to the deformation due to temperature variation of the fluid 16, for example excluding such contribution from the calculation of the extent of deformation when due only to mechanical factors.

Conveniently, one or more closure means 20 may be associated with the cavity 14 to seal such cavity hermetically.

The closure means 20 is appropriately connected to the structural element 10 by means of a suitable system (for example, welding) to ensure the fluid seal 16 in the cavity 14, even when the element as a whole (and consequently also the means of closure 20) undergoes deformation.

The cavity 14 and any closure means 20 are made in such a way as to avoid excessive stress states relative to the average stress state within element 10.

Furthermore, the hermetically sealed cavity 14 may conveniently accommodate a series of other devices useful for structural monitoring, which also measure, among other things, acceleration, inclination, electrical potential, and spatial position. All of these devices, due to the configuration of the integrated measuring system 9, are very well insulated from the outside and thus protected.

In particular, the temperature measurement has without a doubt advantages in terms of protection and risk assessment in fire conditions. For this purpose, it is useful to use high-temperature-resistant materials for constructing the system elements and devices that measure the desired quantities.

Preferably, the closing means 20 are configured so as to allow the connection between the devices measuring pressure and/or temperature 18 with a power and/or data transfer system 22, adapted to power such devices 18 and/or to communicate the data collected within the cavity 14. For example, in the case where the internal devices require cable-type connections, the closure component 20 must conveniently provide for the passage of any electrical connections that transmit power and signals to and from the devices 18 housed inside the cavity 14.

Figure 4:
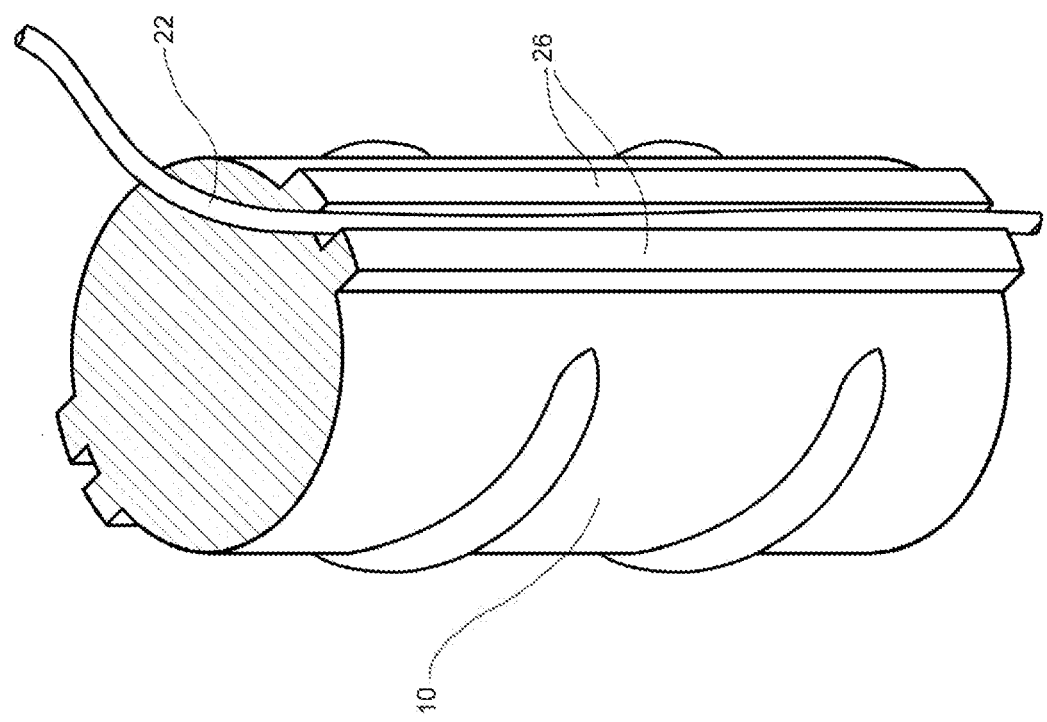
FIG. 4 is a schematic perspective view of a structural element according to an embodiment of the invention.

Any power and data transmission cables or in general the data and power transfer system 22 may be housed in longitudinal ribs 26 obtained on the bars 10, suitably shaped for this purpose (as in the example shown in FIG. 4).

Power and data transfer may also take place via a wireless system, for example using the magnetic and electrical properties of the reinforcement bars.

The system as described above relates the deformation of a limited section of the structural element 10 (comprising the cavity 14) with the deformation before and after the cavity along the longitudinal axis 11 of the structural element.

To reduce the deviation of the stress/deformation measurement between the zone comprising the cavity and the adjacent zones along the longitudinal axis of the element, as well as to reduce the perturbation in terms of deformations and stresses, it is possible to associate with the structural element 10 a radial protrusion or rib 24 which restores, section by section, the area of material missing due to the presence of the cavity 14.

More specifically, the additional rib 24 may be associated with the structural element 10, and has a cross section with an area corresponding to the area of the cross section of the cavity 14.

According to a preferred embodiment, the protrusion 24 is positioned in a radially outer position with respect to the structural element, conveniently near the portion of such element 10 wherein the cavity 14 is present. In particular, the protrusion 24 is positioned at the cross section of the structural element 10 on which the cavity 14 lies.

In this way, the average deformation in the section related to the volume variation of the cavity 14 is more similar to that of the other sections of the structural element 10.

A reduction in the overall dimensions of the system (cavity 14, pressure and temperature measuring devices 18, hermetic sealing components 20, etc.) reduces the size of the outer rib 24 and the perturbations mentioned above.

The presence of outer ribs does not significantly alter the force/deformation state of the element. In steel structures for reinforcement in reinforced concrete, outer rib elements are normally made during the rolling stages, to improve the adhesion between steel and concrete. The mechanical characteristics do not undergo alterations or modifications that compromise the correct structural behavior.

More generally, the system may be realized on elements of any material for which volume changes may be obtained following the application of an action involving deformations, and wherein a hermetically sealed cavity may appropriately be formed.

Figure 5:
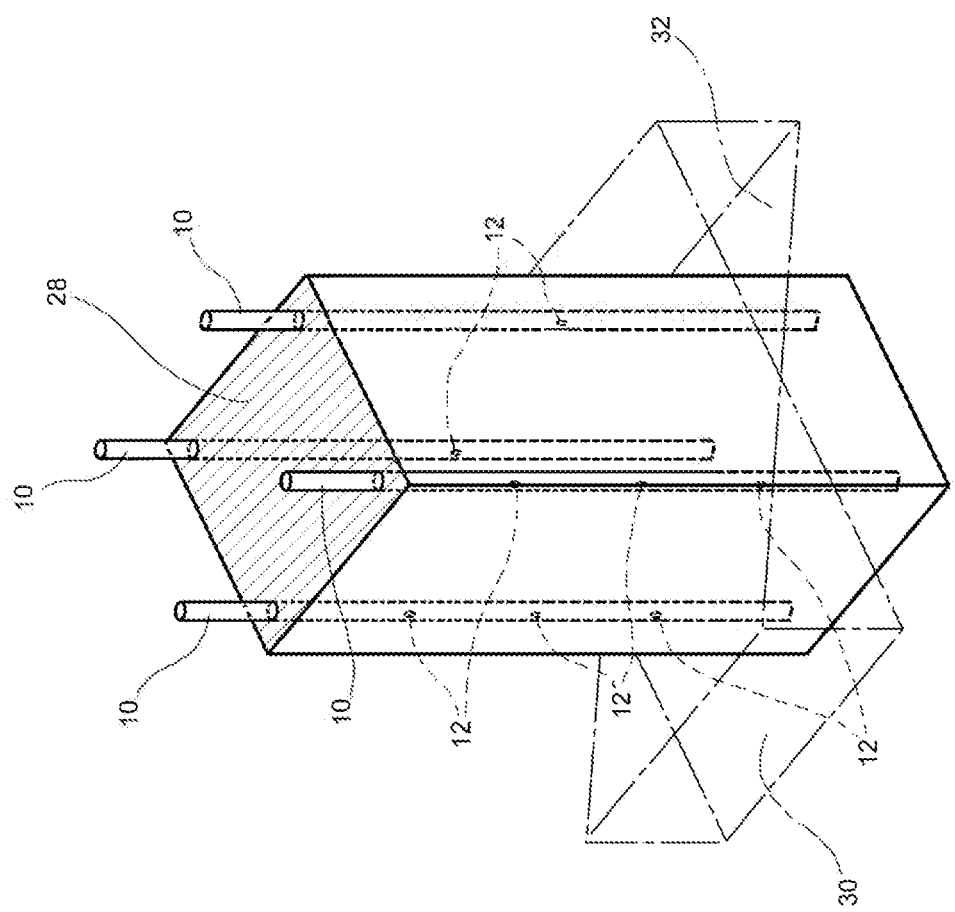
FIG. 5 is a schematic perspective view of a superstructure (in the specific case, a portion of a reinforced concrete pillar) configured to incorporate a plurality of structural elements comprising an integrated measurement system according to an embodiment of the invention.

In the case, for example, of reinforced concrete elements 28 (as may be seen for example in FIG. 5), the reinforcements provided with the system described in the present patent may be conveniently arranged at the edges of the sections of such elements so as to record deformations close to the maximum points for each item and in each section. In particular, the areas wherein the cavities 14 of the bars 10 which comprise the reinforcement of the concrete element would be aligned on a plane orthogonal to the axis of said element 28 (pillar, beam, etc.). Thus, from the readings of the deformation values of the reinforcements at the points of the section, it is possible to reconstruct substantially the entire deformation plane (shown by way of example in FIG. 5 as a first plane 30) of the single section of the element 28, starting from the initial deformative situation (shown by way of example in FIG. 5 as a second plane 32).

Moreover, to improve the durability of the system, it is possible to provide, upon completing the system and after having arranged any electrical connections for the passage of signals and power, an epoxide resin coating.

The integrated system 9 is particularly advantageous for monitoring deformations/stresses along the longitudinal axis of steel reinforcements for reinforced concrete structures. For substantially single-dimensional elements such as pillars, beams, floors, etc. steel reinforcement elements may be considered as stressed predominantly along their longitudinal axis 11.

The system may be used to make load cells.

The measuring system 12 is integral with the structural element 10 and records the residual deformation thereof. This feature makes the system particularly useful in civil structures and infrastructures to evaluate the structural and residual safety status after an exceptional load event or seismic event occurs.

Conveniently, multiple integrated measuring systems 9 may be placed in the same structural element 10, distributed in a more or less regular way along the longitudinal direction of the structural element 10.

Various aspects and embodiments of an integrated system and a method for measuring the deformation and/or stress in structural elements according to the present invention have been described. It is understood that each embodiment may be combined with any other embodiment. The invention, moreover, is not limited to the described embodiments, but may be varied within the scope of protection as described and claimed herein.

The invention claimed is:

1. An integrated measuring system, comprising:
   a structural element, incorporable in a building construction and elongated in a longitudinal direction, said structural element having an internal cavity hermetically closed or closable by a closure component, said internal cavity being filled with a compressible fluid;
   a measurement system comprising a pressure measuring device in contact with the compressible fluid in the internal cavity, said measurement system further comprising a device for measuring temperature of the compressible fluid and/or temperature of the inner wall of the internal cavity, in such a way that the measurement system is able to determine a volume variation of the internal cavity by measuring a pressure and temperature variation of the compressible fluid resulting from an action imparted to the structural element, wherein the volume variation is used as a correlation to measure deformations and/or stresses on the structural element along said longitudinal direction,
   wherein the internal cavity extends along a direction perpendicular with respect to said longitudinal direction; and
   wherein the structural element is a metallic bar for reinforced concrete.

2. The system of claim 1, wherein the internal cavity intersects a central longitudinal axis of the structural element.

3. The system of claim 1, wherein the internal cavity passes through the structural element.

4. The system of claim 1, wherein the compressible fluid is a gas or a liquid/gas mixture.

5. The system of claim 1, wherein the pressure measuring device is immersed in the compressible fluid.

6. The system of claim 1, wherein the closing means are configured so as to allow a connection between the devices measuring pressure and/or temperature with a power and/or data transfer system, which powers said measuring devices and communicates data collected within the internal cavity.

7. The system of claim 1, in which a radially outer projection projects from the structural element and is placed at the cross-section of the structural element on which the internal cavity lies, said radially outer projection having a cross-section having an area equivalent to the area of the cross-section of said internal cavity.

8. A method for measuring deformations and/or stresses along a longitudinal direction of a structural element elongated in the longitudinal direction, said structural element being incorporable in a building construction and being subjectable to an action and being a metallic bar for reinforced concrete, the method comprising the steps of:
   a) providing at least one cavity internal to the structural element, oriented in a direction perpendicular with respect to a central longitudinal axis of the structural element;
   b) filling the cavity with a compressible fluid and sealing the cavity by closing means;
   c) coupling a measurement system to the cavity, said measuring system comprising a measuring device of the pressure of the compressible fluid, and a device for measuring temperature of the compressible fluid and/or temperature of the inner wall of the cavity;
   d) measuring pressure and temperature variations of the compressible fluid, determining a variation of volume of the cavity, and establishing a relationship between said volume variation and a longitudinal deformation of the structural element.

9. The method of claim 8, wherein step b) is carried out by filling the cavity with a gas or a gas/liquid mixture.

10. The method of claim 8, wherein the cavity intersects a central longitudinal axis of the structural element.

11. The method of claim 8, further comprising the step of determining a priori a relationship between temperature and deformation of a structural element subject to design operative conditions, and calibrating the system converting the temperature and pressure variations of the compressible fluid to the longitudinal deformation and/or stress of the structural element, so as to exclude from calculation a contribution of a temperature variation of the fluid.

12. The method of claim 8, further comprising the step of applying an additional radially outer projection to the structural element, placing said additional radially outer projection at the cross-section of said structural element on which the cavity lies in such a way as to restore the area of material missing due to the presence of the cavity.

13. A structural element incorporable in building constructions, comprising a plurality of integrated measuring systems, said integrated measuring systems comprising:
   a structural element, incorporable in a building construction and elongated in a longitudinal direction, said structural element having an internal cavity hermetically closed or closable by a closure component, said internal cavity being filled with a compressible fluid, said structural element being a metallic bar for reinforced concrete;
   a measurement system comprising a pressure measuring device in contact with the compressible fluid in the internal cavity, said measurement system further comprising a device for measuring temperature of the compressible fluid and/or temperature of the inner wall of the internal cavity, in such a way that the measurement system is able to determine a volume variation of the internal cavity by measuring a pressure and temperature variation of the compressible fluid resulting from an action imparted to the structural element, wherein the volume variation is used as a correlation to measure deformations and/or stresses on the structural element along said longitudinal direction, wherein the internal cavity extends along a direction perpendicular with respect to said longitudinal direction.

\* \* \* \* \*